United States Patent
Lee

(10) Patent No.: US 7,660,412 B1
(45) Date of Patent: Feb. 9, 2010

(54) GENERATION OF DEBUG INFORMATION FOR DEBUGGING A NETWORK SECURITY APPLIANCE

(75) Inventor: Jin-Shi Lee, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 830 days.

(21) Appl. No.: 11/298,330

(22) Filed: Dec. 9, 2005

(51) Int. Cl.
  *G06F 9/44* (2006.01)
(52) U.S. Cl. .............................. 380/2; 726/22; 717/124
(58) Field of Classification Search ................ 380/2; 717/124
  See application file for complete search history.

(56) References Cited

U.S. PATENT DOCUMENTS

| | | | | |
|---|---|---|---|---|
| 4,393,796 A | * | 7/1983 | Dunn et al. | 112/445 |
| 5,021,997 A | * | 6/1991 | Archie et al. | 714/31 |
| 5,093,915 A | * | 3/1992 | Platteter et al. | 713/2 |
| 5,150,609 A | * | 9/1992 | Ebner et al. | 73/114.61 |
| 5,367,667 A | * | 11/1994 | Wahlquist et al. | 714/32 |
| 5,418,960 A | * | 5/1995 | Munroe | 713/1 |
| 5,521,849 A | * | 5/1996 | Adelson et al. | 702/119 |
| 5,675,833 A | * | 10/1997 | Radko et al. | 710/17 |
| 5,894,425 A | * | 4/1999 | Saliba | 710/62 |
| 6,067,407 A | * | 5/2000 | Wadsworth et al. | 709/224 |
| 6,092,194 A | | 7/2000 | Touboul | |
| 6,148,387 A | | 11/2000 | Galasso et al. | |
| 6,167,520 A | | 12/2000 | Touboul | |
| 6,321,267 B1 | | 11/2001 | Donaldson | |
| 6,480,962 B1 | | 11/2002 | Touboul | |
| 6,804,780 B1 | | 10/2004 | Touboul | |
| 6,868,510 B1 | * | 3/2005 | Nozu | 714/48 |
| 6,892,304 B1 | | 5/2005 | Galasso et al. | |
| 6,931,522 B1 | | 8/2005 | Raghavan et al. | |
| 6,961,871 B2 | * | 11/2005 | Danialy et al. | 714/30 |
| 6,973,577 B1 | | 12/2005 | Kouznetsov | |
| 7,519,651 B2 | * | 4/2009 | Ehara | 709/201 |
| 2004/0093538 A1 | * | 5/2004 | Hester et al. | 714/45 |
| 2005/0120273 A1 | * | 6/2005 | Hudson et al. | 714/38 |
| 2005/0223298 A1 | * | 10/2005 | Higuchi et al. | 714/46 |
| 2006/0161725 A1 | * | 7/2006 | Lee et al. | 711/103 |
| 2007/0011419 A1 | * | 1/2007 | Conti | 711/163 |

\* cited by examiner

*Primary Examiner*—Ponnoreay Pich
(74) *Attorney, Agent, or Firm*—Okamoto & Benedicto LLP

(57) ABSTRACT

Debugging of a network security appliance is facilitated by allowing for generation of debug information in a user-friendly manner. In one embodiment, the network security appliance automatically detects a presence of a file in a removable non-volatile memory and, in response, places at least one of its components in debug mode. This allows the component to write debug information to the removable non-volatile memory. Removal of the removable non-volatile memory from the network security appliance automatically triggers placement of the component in non-debug mode. The debug information generated in the network security appliance may be forwarded to a server computer for analysis.

14 Claims, 5 Drawing Sheets

GENERATION OF DEBUG INFORMATION FOR DEBUGGING A NETWORK SECURITY APPLIANCE

BACKGROUND OF THE INVENTION

1. Field of the Invention

The present invention relates generally to computer systems, and more particularly but not exclusively to debugging of computer systems in the field.

2. Description of the Background Art

Most manufacturers do their best to ensure that their products work as intended. However, even with tight quality control, defective products can and do leave the factory. This is especially true with relatively complex products like computer systems. The troubleshooting of defective computer systems is also referred to as "debugging." For example, a defective computer program may be troubleshot by placing it in debug mode. In debug mode, the program writes out debug information, such as register and variable contents, texts and comments placed at certain points of the program, and other information indicative of the internal operation of the program, to a debug log. The contents of the debug log may be displayed on a computer screen as debug information is received or stored in mass storage for later analysis. The debugging of computer systems is usually difficult whether at the factory or in the field at a customer site. However, having to debug the computer system at the customer site is especially difficult given customer expectations and more so when there are no field service personnel available in the area. To make matters worse, some computer systems, such as network security appliances and other special purpose computers, may be too difficult for the customer to troubleshoot even with remote help from customer service or may not have enough computing resources to facilitate debugging.

SUMMARY

Debugging of a network security appliance is facilitated by allowing for generation of debug information in a user-friendly manner. In one embodiment, the network security appliance automatically detects a presence of a file in a removable non-volatile memory and, in response, places at least one of its components in debug mode. This allows the component to write debug information to the removable non-volatile memory. Removal of the removable non-volatile memory from the network security appliance automatically triggers placement of the component in non-debug mode. The debug information generated in the network security appliance may be forwarded to a server computer for analysis.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that the components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may then be executed by a processor. Components may be implemented separately in multiple modules or together in a single module.

A network security appliance is a stand-alone, special purpose computer system for protecting a network from network security threats, such as malicious code (e.g., computer virus, worm, Trojan, spyware), unwanted messages (e.g. spam), and unauthorized access (e.g. hacking), for example. Unlike a general purpose computer, an appliance may be resource-limited in that it may not have enough computing resources to facilitate debugging. For example, some appliances do not have a keyboard or computer screen. This lowers the cost of the appliance and makes the appliance more of a "black box" suitable for "plug and play." Some appliances also do not have enough memory or storage locations for a debug log. Being special purpose computers, appliances typically do not have a user-friendly user interface, unlike general purpose computers. All of these make an appliance relatively difficult to debug. Other special purpose computers, such as routers and network switches, may also have the same debugging issues. Embodiments of the present invention facilitate debugging of special purpose computers by providing user-friendly techniques for generating debug information. These techniques will be described in the context of a network security appliance, but should be understood as also suitable for other applications.

Figure 1:
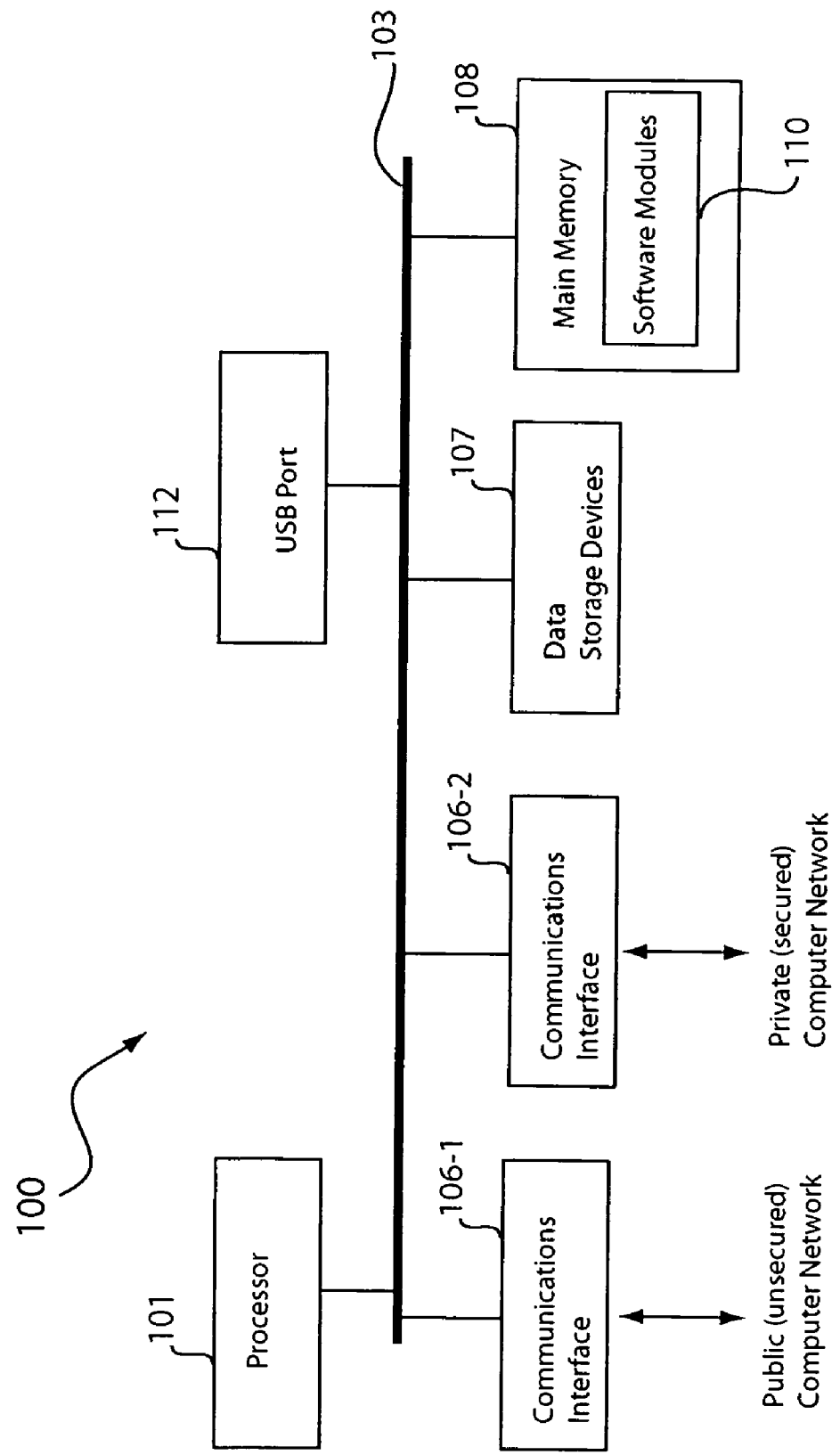
FIG. 1 shows a schematic diagram of a network security appliance in accordance with an embodiment of the present invention.

Referring now to FIG. 1, there is shown a schematic diagram of a network security appliance 100 in accordance with an embodiment of the present invention. The network security appliance 100 may have less or more components to meet the needs of a particular application. As shown in FIG. 1, the network security appliance 100 may include a processor 101, such as those from the Intel Corporation or Advanced Micro Devices, for example. The network security appliance 100 may have one or more buses 103 coupling its various hardware components. The network security appliance 100 may include one or more communications interfaces 106 (i.e. 106-1, 106-2), such as network adapters or modems, for coupling to a network. In the example of FIG. 1, a communications interface 106-1 may be coupled to a public (i.e. unsecured) computer network, such as the Internet, while a communications interface 106-2 may be coupled to a private (i.e. secured) computer network. This advantageously allows the network security appliance 100 to isolate and protect computers in the private computer network from the outside world. The network security appliance 100 may also include one or more data storage devices 107 (e.g. hard and optical disks) and a main memory 108. In the example of FIG. 1, the main memory 108 comprises software modules 110, which may include the later described (see FIG. 2) debug manager 113, antivirus (AV) program 114, and one or more application programs 115. The software modules 110 may be stored in a data storage device 107 and then loaded automatically into the main memory 108 upon boot-up. The software modules 110 are executed by the processor 101.

In the example of FIG. 1, the network security appliance 100 is resource-limited in that it does not have an attached keyboard and display monitor and have limited storage space. This advantageously lowers the cost of the network security appliance 100, decreases its space requirement, and makes it less intimidating to customers. Cost is a very important consideration in competitive markets. By lowering the cost of the network security appliance 100, more customers will be able to afford one and thus be able to protect their networks (e.g. home or corporate) from network security threats.

In one embodiment, the network security appliance 100 includes a port for accepting removable non-volatile memory. In the example of FIG. 1, such a port is shown as comprising a universal serial bus (USB) port 112. As will be more apparent below, the removable non-volatile memory may include a component that works with one or more components in the network security appliance 100 to facilitate generation of debug information for troubleshooting purposes.

Figure 2:
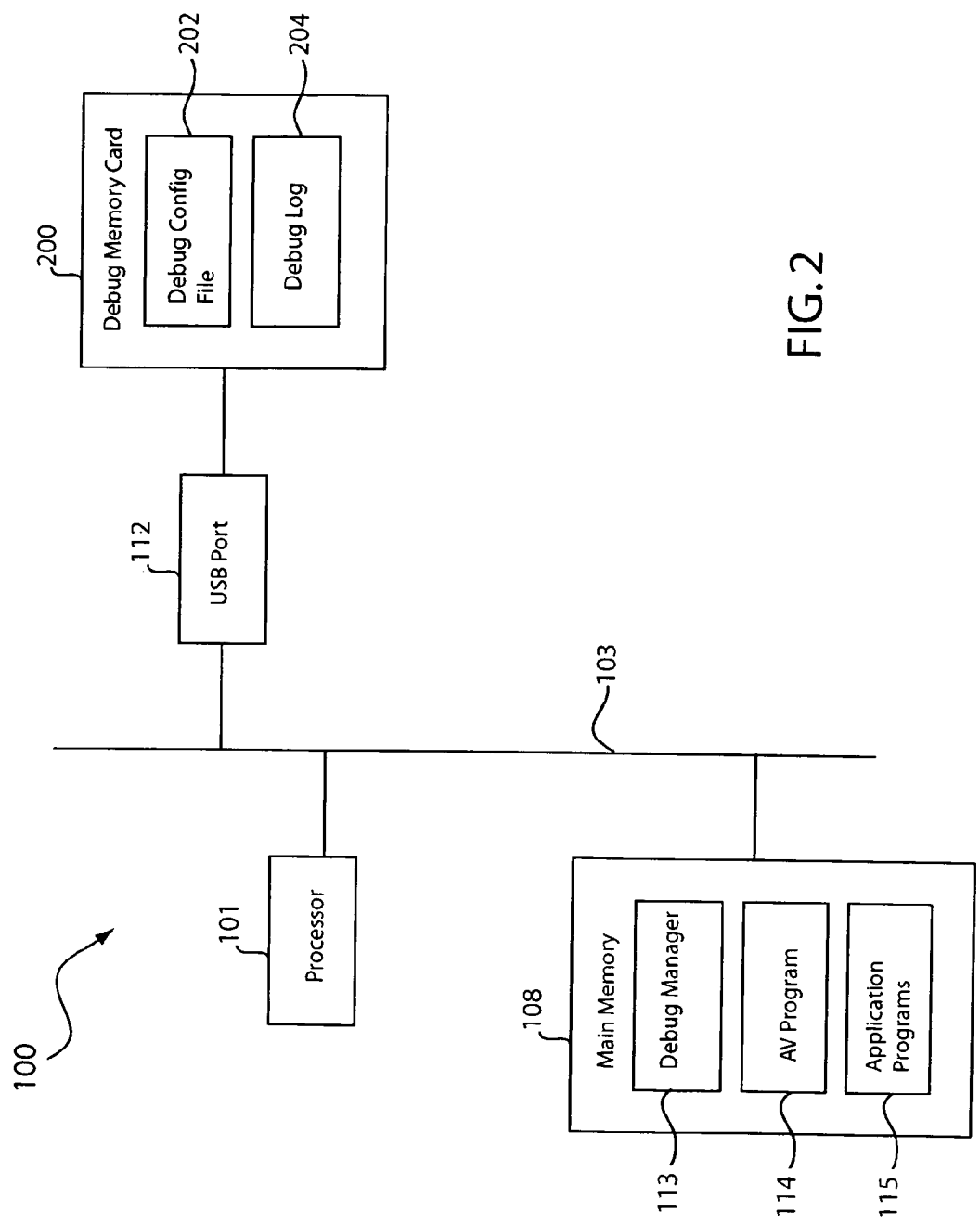
FIG. 2 shows the network security appliance with an attached removable non-volatile memory card in accordance with an embodiment of the present invention.

FIG. 2 shows the network security appliance 100 with an attached removable non-volatile memory card in accordance with an embodiment of the present invention. As can be appreciated by those of ordinary skill in the art, by "removable" it is meant that the memory card is designed to be readily inserted and removed by a user in the field. In the example of FIG. 2, the removable non-volatile memory card is shown as comprising a debug memory card 200. In one embodiment, the debug memory card 200 comprises a USB drive. A USB drive may comprise solid state (e.g. FLASH) or magnetic media (e.g. hard drive), for example. Because a USB drive may have 1 GB or more of non-volatile memory, it may store relatively large debug information.

In the example of FIG. 2, the debug memory card 200 comprises a debug configuration file 202 and a debug log 204. The debug configuration file 202 may comprise data specifying a particular debug level, a security code, the component of the network security appliance 100 to be placed in debug mode, and other debugging configuration information. A debug level indicates the amount and type of debug information to be generated by a component of the network security device. For example, a debug level 1 may indicate logging of the contents of a first number of variables of a computer program, a debug level 2 may indicate logging of the contents of a second number of variables of the computer program (the second number being higher than the first number), and so on. A debug level may also indicate the frequency at which debug information is to be written to the debug log 204, whether to enable or disable particular features of the network security appliance 100, and other debugging options. As generation of debug information uses computing resources, providing different debug levels advantageously allows tailoring generation of debug information depending on the problem and the severity of the problem.

The security code may be encrypted or unencrypted data for determining the authenticity of the debug configuration file 202. This prevents inadvertent or unauthorized placement of components of the network security appliance 100 in debug mode.

The debug log 204 may comprise a file for storing debug information. The debug information may comprise troubleshooting-related information provided by a component of the network security appliance 100 when placed in debug mode. The debug information may comprise contents of variables at different places in a program, comments or flags indicative of whether a particular module, function, or routine has been executed, information relating to an internal operation of a component, and so on. Each piece of debug information may be written to the debug log 204 with a time stamp.

In the example of FIG. 2, the main memory 108 comprises a debug manager 113, an antivirus program 114, and one or more application programs 115. The debug manager 113 may comprise computer-readable program code for automatically detecting the presence or absence of the debug configuration file 202 in the network security appliance 100 and, depending on the presence or absence of the debug configuration file 202, for placing a component of the network security appliance 100 in debug mode or normal (i.e. non-debug) mode. It is to be understood that the functionality of the debug manager 113 may be implemented in a separate program or integrated in another program, such as in the antivirus program 114, in the network security appliance 100.

In one embodiment, the debug manager 113 listens for an event indicative of the presence of a newly installed USB device in the network security appliance 100. Upon detection of a newly installed USB device in the network security appliance 100, the debug manager 113 makes a determination as to whether the newly installed USB device contains a debug configuration file 202. If so, the debug manager 113 checks the debug configuration file 202 for the security code for authentication purposes. Thereafter, the debug manager 113 checks the debug configuration file 202 for a debug level and other debug configuration information. When an authorized debug configuration file 202 is present in the network security appliance 100, the debug manager 113 places the component of the network security appliance 100 specified in the debug configuration file 202 in debug mode at the specified debug level.

The antivirus program 114 may comprise computer-readable program code for detecting and stopping network security threats, such as malicious code (e.g., computer virus, worm, Trojan, spyware), unwanted messages (e.g. spam), and unauthorized access (e.g. hacking), for example. The antivirus program 114 may be implemented using conventional network security algorithms without detracting from the merits of the present invention. It is to be noted that the antivirus program 114 may comprise modules other than those directly related to scanning. For example, the antivirus program 114 may also include interface modules, drivers, and other program modules provided by the manufacturer of the network security appliance. The application programs 115 may comprise other programs running in the network security appliance 100.

In one embodiment, the antivirus program 114 and other components of the network security appliance 100 may be placed in debug mode. For example, the antivirus program 112 may be configured to write the contents of one or more of its variables to the debug log 204 when placed in debug mode.

As in conventional debugging, this allows for monitoring of the operation of the antivirus program 112 at different points in the program. In one embodiment, the antivirus program listens for a message from the debug manager 113 to get into debug mode at a particular debug level or to get out of debug mode (e.g. go back to normal operation).

The other components of the network security appliance 100 have already been discussed with reference to FIG. 1.

Figure 3:
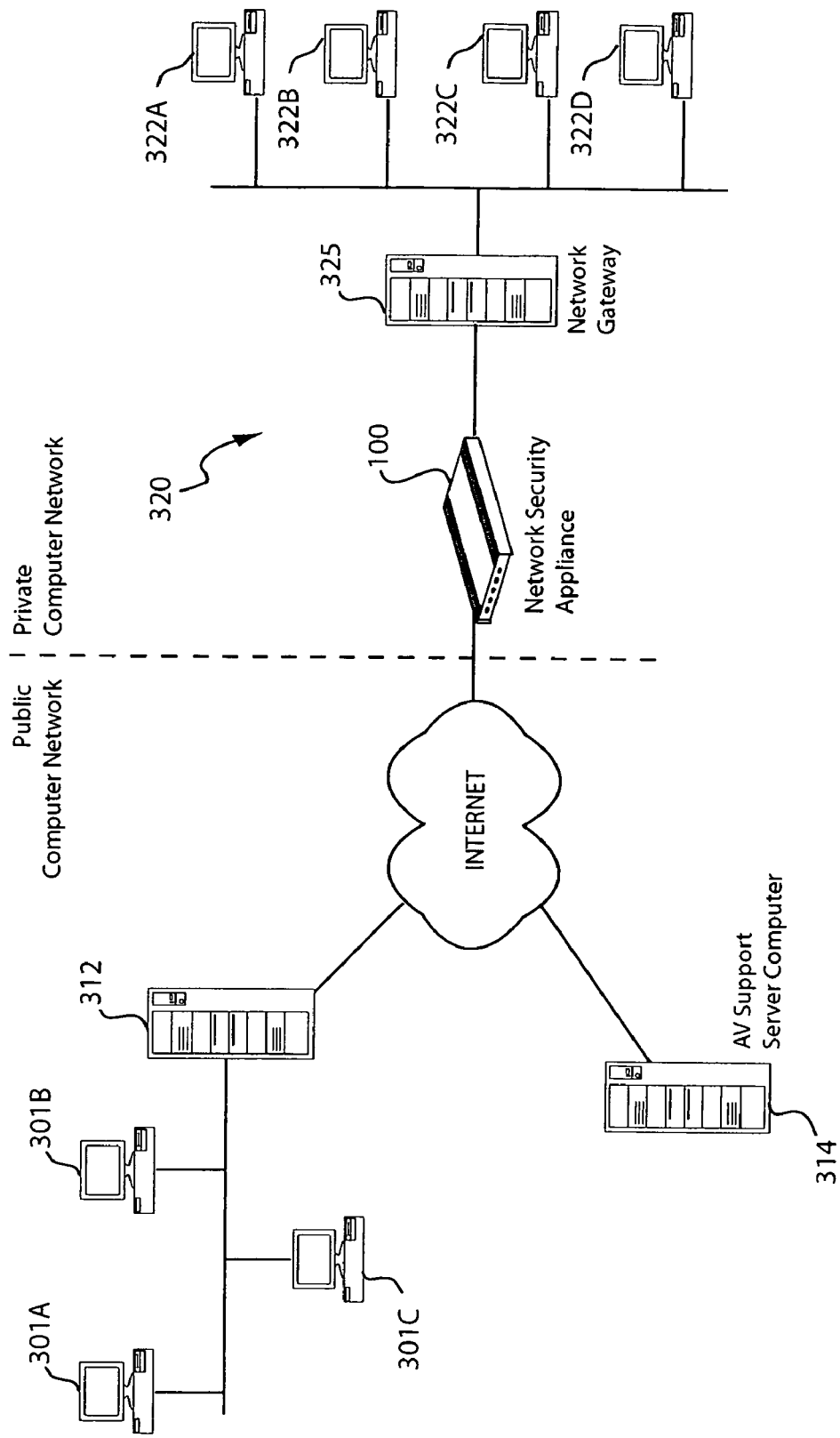
FIG. 3 shows a schematic diagram of a computing environment for the network security appliance in accordance with an embodiment of the present invention.

FIG. 3 shows a schematic diagram of a computing environment for the network security appliance 100 in accordance with an embodiment of the present invention. In the example of FIG. 3, the computing environment includes a private computer network 320 coupled to a public computer network comprising the Internet. As is well known, computers all over the world may be coupled to the Internet. For example, a computer 312 may be a server computer providing gateway, Internet access, or web services. As a further example, client computers 301 (i.e., 301A, 301B, 301C) may be part of another computer network coupled to the Internet by way of the server computer 312.

An antivirus support server computer 314 may comprise a server operated by the manufacturer of the network security appliance 100. The support server computer 314 may be configured to provide software updates to the network security appliance 100. As will be more apparent below, the support server computer 314 may also be configured to send and receive the debug configuration file 202 and debug log 204 to another computer (e.g. a computer 322A) to facilitate debugging of the network security appliance 100.

The private computer network 320 may include the network security appliance 100, network gateway 325, and client computers 322 (i.e., 322A, 322B, 322C, 322D). The client computers 322 may be desktop computers, while the network gateway 325 may be a server computer. The network gateway 325 may provide Internet access, e-mail, and/or file transfer services to the client computers 322, for example. In the example of FIG. 3, the network security appliance 100 is deployed at an entry point of the private computer network 320. That is, in the example of FIG. 3, the network security appliance 100 is deployed as a gatekeeper between the private computer network 320 and the public computer network. The network security appliance 100 is thus in a position to screen data going to or leaving the private computer network 320. Depending on the application, the network security appliance 100 may also be deployed within the private computer network 320. For example, the network security appliance 100 may also be deployed within the private computer network 320 between the network gateway 325 and the client computers 322.

The network security appliance 100 is an "appliance" in that it is a stand-alone apparatus designed primarily for network security. This allows the network security appliance 100 to be optimized for its intended function. This also allows the network security appliance 100 to be physically separated from servers, such as the network gateway 325, thereby making the appliance more robust against external attacks. That is, an attack taking advantage of a vulnerability of an application running on a server cannot easily penetrate the network security appliance 100. Furthermore, using appliance architecture allows the networks security appliance 100 to be sold at low cost and be deployed separately, and often times transparently, from other computers in the private computer network 320.

Figure 4:
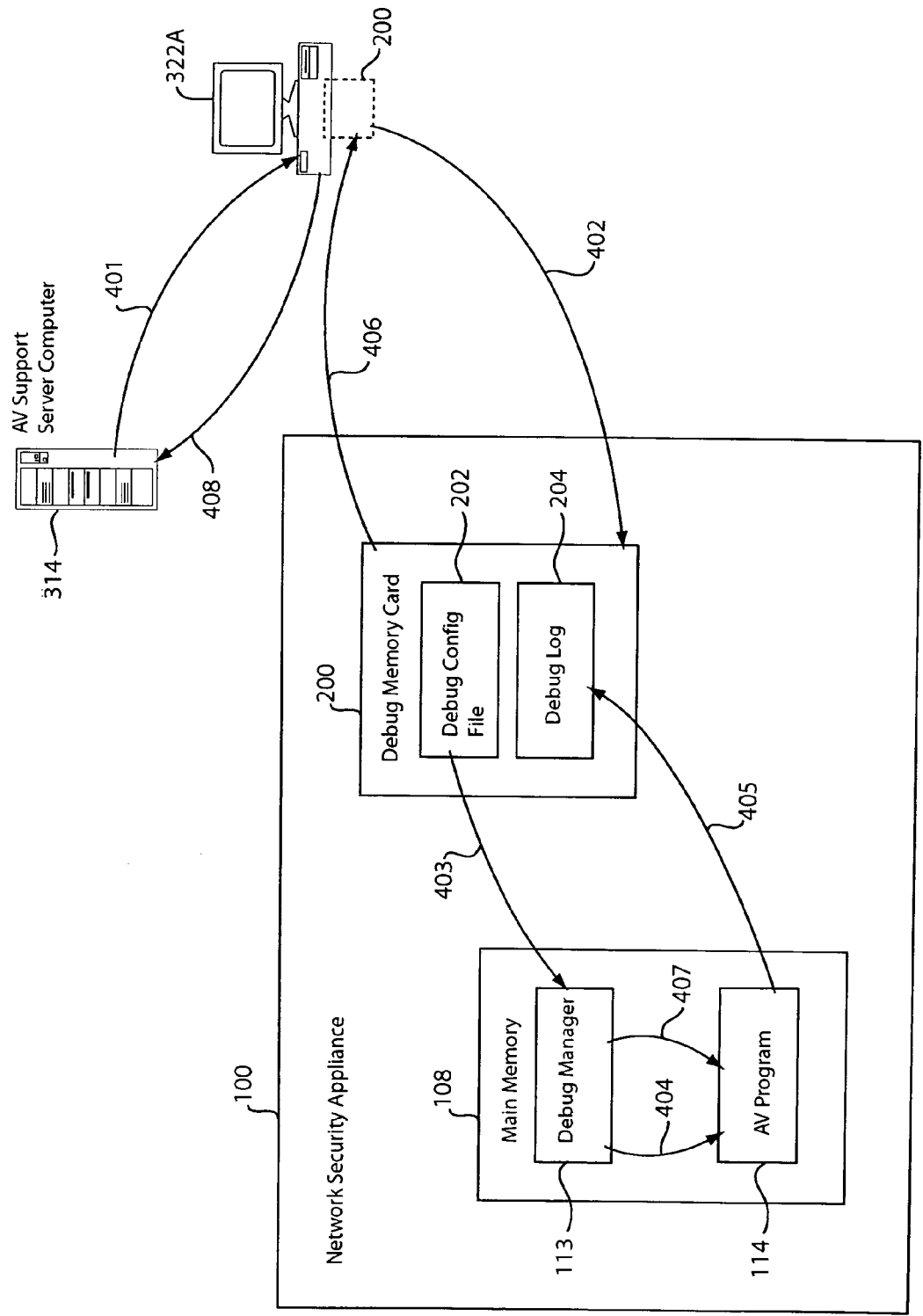
FIG. 4 schematically illustrates a method of generating debug information in accordance with an embodiment of the present invention.

FIG. 4 schematically illustrates a method of generating debug information in accordance with an embodiment of the present invention. The debug information may be needed to debug a defective network security appliance 100 in the field at a customer site. The method begins with the customer calling the manufacturer's customer support center about an unidentified problem with the network security appliance 100. In response, the customer support center allows the customer to receive the debug configuration file 202 and the debug log 204 (e.g. a file). In one embodiment, the debug configuration file 202 and the debug log 204 are downloaded by the customer from the support server computer 314 to the client computer 322A over the Internet (arrow 401). The debug configuration file 202 and the debug log 204 are depicted as being separate files for clarity of illustration, but may also be combined together in a single file.

In one embodiment, the debug configuration file 202 and the debug log 204 are written to the debug memory card 200 attached to the USB port of the client computer 322A. The customer removes the debug memory card 200 from the client computer 322A and plugs the debug memory card 200 into the USB port of the network security appliance 100 (arrow 402). The debug memory card 200 may include plug and play features that allow it to be automatically detected by a USB driver in the network security appliance 100. In one embodiment, upon attachment to the network security appliance 100, the debug memory card 200 is detected by the USB driver, which then alerts the debug manager 113 (arrow 403). The debug manager 113 may check the debug memory card 200 for the presence of the debug configuration file 202 and then authenticate the debug configuration file 202 by looking for the security code. Upon authentication of the debug configuration file 202, the debug manager 113 may determine the component to be placed in debug mode and the debug level from debug configuration information stored in the debug configuration file 202. In the example of FIG. 4, the debug configuration information in the debug configuration file 202 indicates placement of the antivirus program 114 in debug mode at a particular debug level. The debug manager 113 accordingly sends a message to the antivirus program 114 to place it in debug mode (404). In response, the antivirus program 114 starts writing debug information to the debug log 204 (arrow 405). The network security appliance 100 may continue to operate to scan traffic going to and from the private computer network 320 (see FIG. 3) or may run some test routines during the time the antivirus program 114 writes debug information into the debug log 204. After a some predetermined amount of time, which may depend on the severity and type of problem, the customer removes the debug memory card 200 from the network security appliance 200 and plugs the debug memory card 200 into the USB port of the client computer 322A (arrow 406). The debug manager 113, detecting that the debug memory card 200 is no longer plugged into the network security appliance 100 or detecting that the debug configuration file 202 is no longer available, then sends a message to the antivirus program 114 to place it in normal (i.e. non-debug) mode (arrow 407). The customer may then forward the debug log 204 to the support server computer 314 (arrow 408), where the debug log 204 is analyzed by customer service personnel to determine what, if any, is malfunctioning in the network security appliance 100.

As can be appreciated from the foregoing, embodiments of the present invention advantageously allow for generation of debug information without having to connect a computer screen or display to the network security appliance 100 or without having to require the customer to perform relatively complicated procedures.

Figure 5:
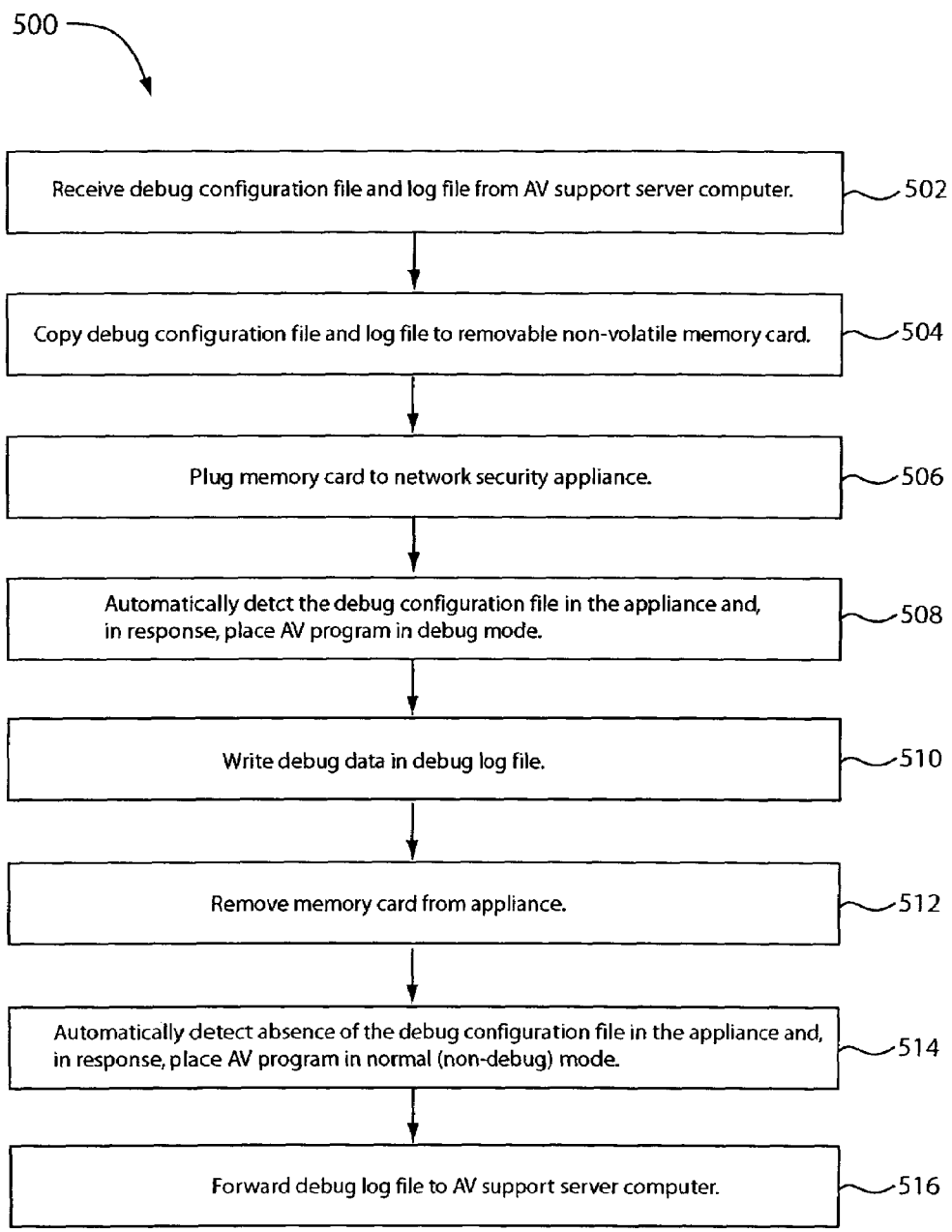
FIG. 5 shows a flow diagram of a method of generating debug information in accordance with an embodiment of the present invention.

Referring now to FIG. 5, there is shown a flow diagram of a method 500 of generating debug information in accordance with an embodiment of the present invention. The method 500 will be explained using the previously described components for illustration purposes, not limitation. The method 500 may be performed using other components without detracting from the merits of the present invention.

In step 502, a debug configuration file and a debug log file may be received from an antivirus support server computer. The debug configuration file and the debug log file may be downloaded by a customer from a server of the manufacturer of a network security appliance upon reporting of a possible problem with the network security appliance. The debug configuration file and the debug log file may be received in a desktop computer of the customer.

In step 504, in the desktop computer, the debug configuration file and the debug log file may be copied to a removable non-volatile memory card, such as a USB drive, for example.

In step 506, the customer may remove the memory card from the desktop computer and plug the memory card to the network security appliance.

In step 508, the network security appliance automatically (i.e. without human intervention) detects the debug configuration file in the memory card and, in response, places an antivirus program in the network security appliance in debug mode in accordance with debug configuration information in the debug configuration file.

In step 510, the antivirus program writes debug information in the debug log file.

In step 512, the customer unplugs the memory card from the network security appliance.

In step 514, the network security appliance automatically detects the absence of the debug configuration file after having detected the debug configuration file (see step 508) and, in response, places the antivirus program in normal (non-debug) mode.

In step 516, the customer plugs the memory card in the desktop computer, from which the debug log is forwarded to the antivirus support server computer (e.g. by e-mail or FTP).

Improved techniques for generating a debug information have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of generating debug information, the method comprising:
   receiving a file in a first computer over a computer network;
   automatically detecting the file in a removable non-volatile memory in a network security appliance separate from the first computer;
   in response to detecting the file in the removable non-volatile memory in the network security appliance, placing a component of the network security appliance in debug mode and causing the component to write the debug information into the removable non-volatile memory, wherein the component comprises an antivirus program; and
   receiving the debug information in a second computer over the computer network.

2. The method of claim 1 wherein the file comprises debug configuration information with a security code for authentication purposes.

3. The method of claim 1 wherein the second computer comprises a server computer operated by a manufacturer of the network security appliance.

4. The method of claim 1 wherein the removable non-volatile memory comprises a universal serial bus (USB) drive.

5. The method of claim 1 further comprising:
   automatically detecting an absence of the file in the network security appliance; and
   in response to detecting the absence of the file, placing the component of the network security appliance in non-debug mode from the debug mode.

6. The method of claim 1 wherein the debug information comprises contents of a variable of the antivirus program in the network security appliance.

7. A network security appliance comprising:
   an antivirus program configured to scan data for computer viruses, the antivirus program being configured to write debug information to a removable non-volatile memory when placed in debug mode, the debug information comprising information indicative of an internal operation of the antivirus program;
   a debug manager configured to automatically detect a presence of a file in a removable non-volatile memory, to place the antivirus program in debug mode upon detection of the presence of the file, and to place the antivirus program in non-debug mode upon automatic detection of an absence of the file; and
   a port for accepting the removable non-volatile memory.

8. The network security appliance of claim 7 wherein the network security appliance is configured to not have an attached keyboard or computer screen during normal operation in a customer site.

9. The network security appliance of claim 7 wherein the port comprises a universal serial bus (USB) port.

10. The network security appliance of claim 7 wherein the removable non-volatile memory comprises a universal serial bus (USB) drive.

11. The network security appliance of claim 7 wherein the debug information comprises a content of a variable of the antivirus program.

12. A method of generating debug information for debugging a network security appliance, the method comprising:
   reporting a problem with a network security appliance to a customer service center;
   receiving a file for troubleshooting the problem, the file being received in a client computer over a computer network, the client computer being physically separate from the network security appliance;
   copying the file to a removable non-volatile memory; and
   plugging the removable non-volatile memory to the network security appliance to automatically place a component of the network security appliance in debug mode and causing the component to write the debug information to the removable non-volatile memory, wherein the component comprises an antivirus program.

13. The method of claim 12 further comprising:
   removing the removable non-volatile memory from the network security appliance to place the component from debug mode to non-debug mode; and
   providing the debug information to a server computer over the computer network.

14. The method of claim 12 wherein the removable non-volatile memory comprises a universal serial bus (USB) drive.

* * * * *